No. 856,573. PATENTED JUNE 11, 1907.
C. W. DRAPER.
COMPUTING DEVICE.
APPLICATION FILED APR. 28, 1904.

3 SHEETS—SHEET 1.

Witnesses
Inventor
Charles W. Draper,
by Mauro, Cameron, Lewis & Massie, Attorneys.

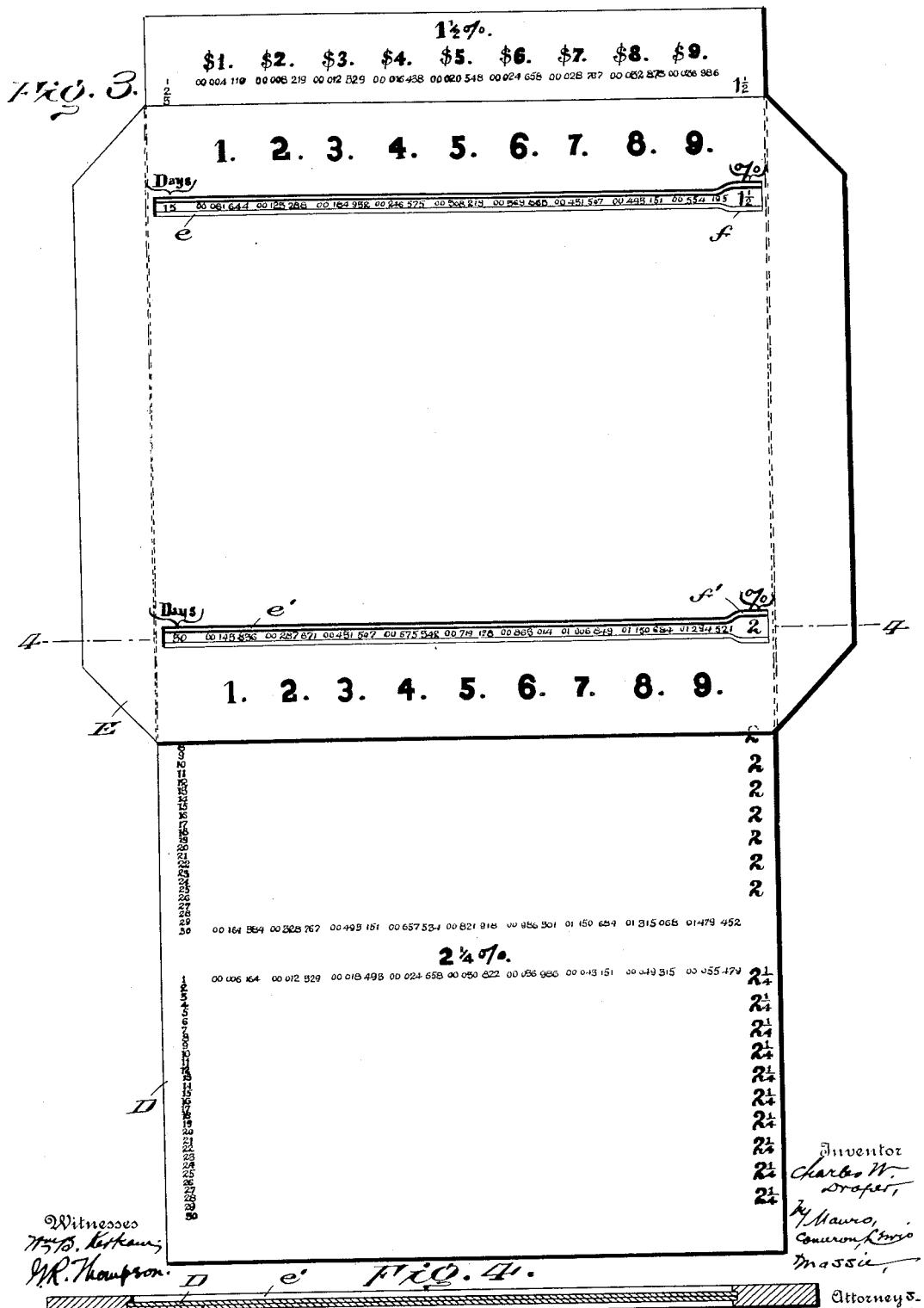

No. 856,573. PATENTED JUNE 11, 1907.
C. W. DRAPER.
COMPUTING DEVICE.
APPLICATION FILED APR. 28, 1904.
3 SHEETS—SHEET 3.
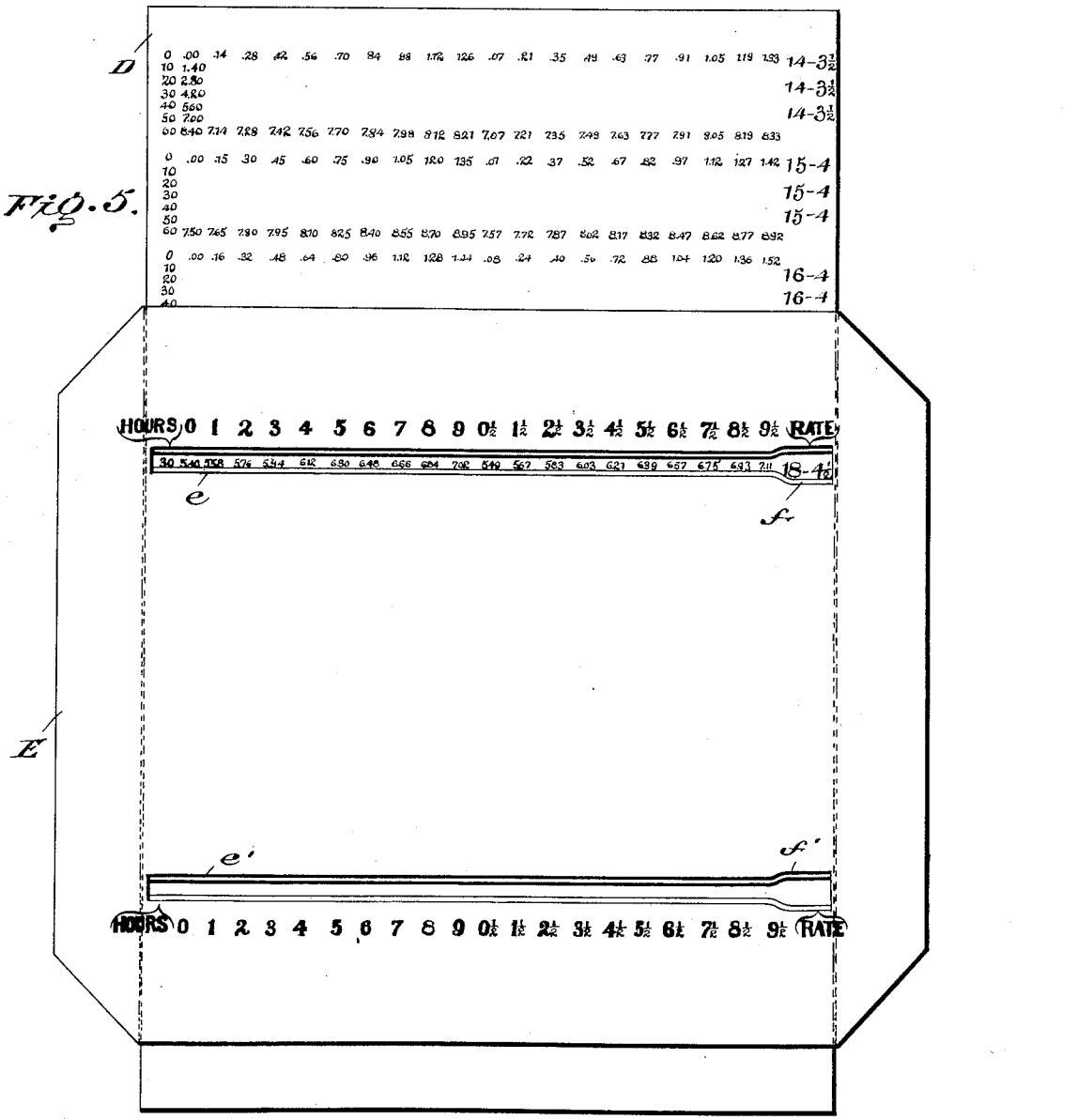
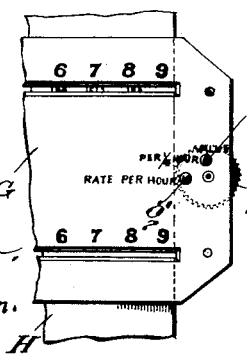
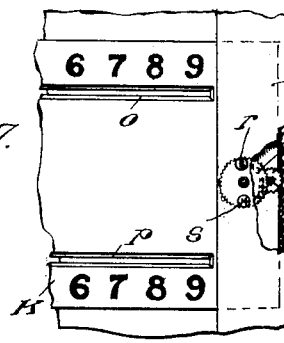

UNITED STATES PATENT OFFICE.

CHARLES W. DRAPER, OF WASHINGTON, DISTRICT OF COLUMBIA.

COMPUTING DEVICE.

No. 856,573.　　　Specification of Letters Patent.　　　Patented June 11, 1907.

Application filed April 28, 1904. Serial No. 205,378.

*To all whom it may concern:*

Be it known that I, CHARLES W. DRAPER, of Washington, District of Columbia, have invented a new and useful Computing Device, which invention is fully set forth in the following specification.

My invention relates to devices for computing interest, wages, or the cost of a designated quantity of any commodity at a designated rate of charge, and particularly to that class of such devices wherein a finder-slide and a table, the latter having printed thereon numbers representing numerous results, are relatively movable to facilitate finding of the particular result of certain given factors.

My present invention comprises improvements in the finder-slide, and in the arrangement of the numbers representing the results and factors thereof, whereby the number on the table representing the particular result sought can be quickly located by minimum movement of the slide and effort on the part of the operator and without danger of confusion with numbers representing other results.

My invention also comprises other features of improvement, all of which will be readily understood by reference to the accompanying drawings, illustrating several of the many possible forms in which the invention may be embodied.

Figure 1:
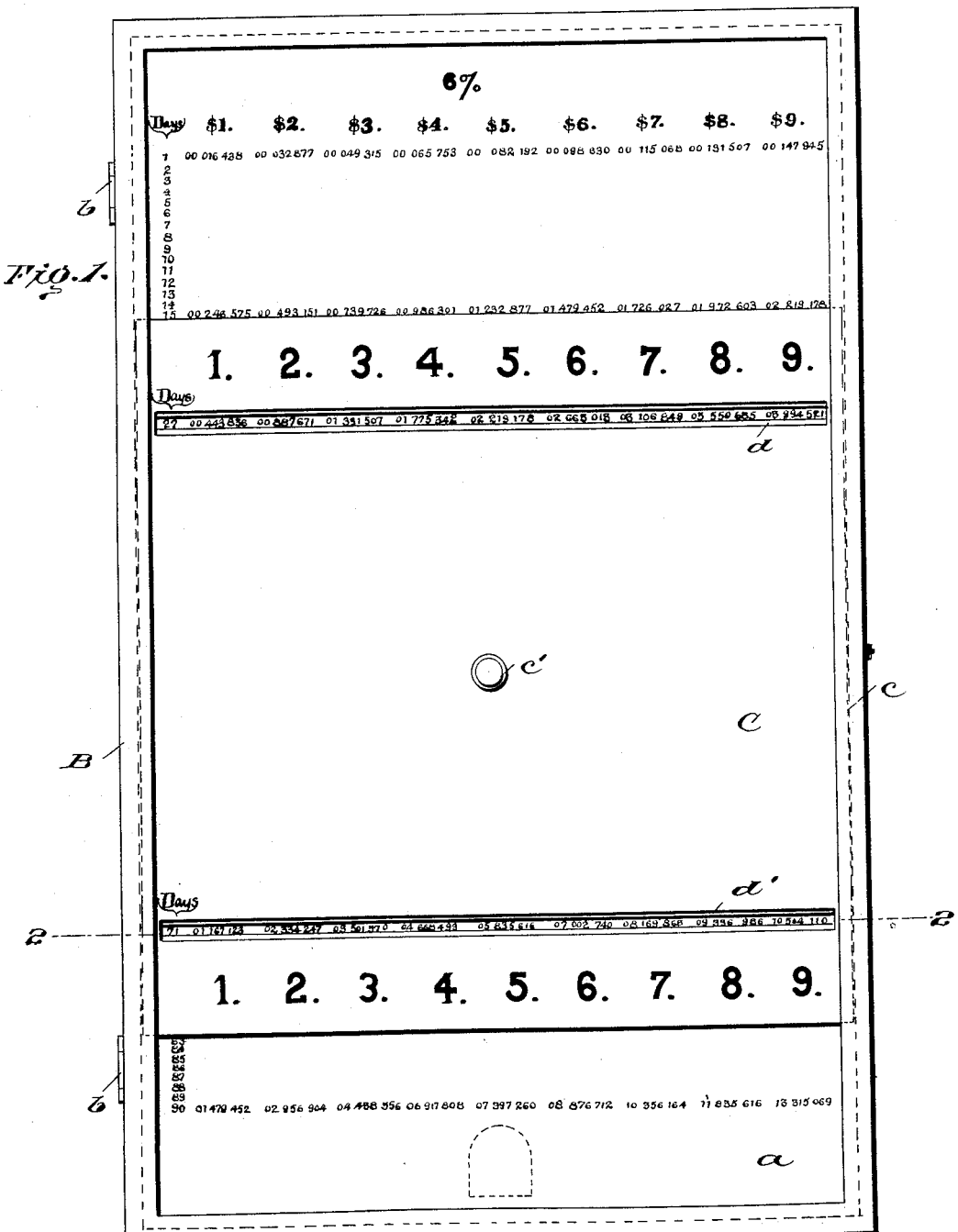
Figure 2:
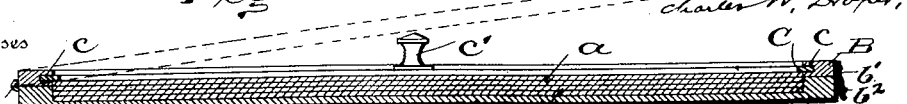

Figure 1 is a plan view, and Fig. 2 a transverse section on line 2—2, of Fig. 1, of one embodiment; Figs. 3 and 5 are plan views, and Fig. 4 a transverse section on line 4—4 of Fig. 3, of another embodiment; Figs. 6 and 7 are fragmentary views illustrating improvements in details.

Referring to Figs. 1 and 2, A is a shallow receptacle or tray adapted to receive a number of tables $a$. Each table comprises a plate or sheet, preferably of stiff paper, cardboard, or other suitable material, having figures representing numerous results printed thereon, preferably on both sides. The tray shown in Fig. 2 contains four tables, the upper face of the topmost table bearing, as shown in Fig. 1, numbers representing the interest on from \$1. to \$9. at 6% for from 1 to 90 days. The uppermost table may be turned over or other tables brought to the top to expose tables at other rates of interest.

B is a frame hinged at $b$ to tray A, and adapted to be secured in its closed position by any suitable catch—such as a spring $b'$ engaging a knob $b^2$.

C is a finder-slide adapted to move freely in grooves $c$, $c$, in the inner edges of the frame B; a knob $c'$ may be gripped for imparting the movement. As shown, the slide is of such width as to cover a large portion of the underlying table and is provided with two transverse beveled slots $d$, $d'$ near its upper and lower edges, respectively. Numbers on the upper half of the table are intended to be read through the slot $d$, and those on the lower half, through the slot $d'$. By locating these slots at the proper distance apart relative to the lines of figures on the table, it is possible to expose every figure on the table through one or the other slot by moving the slide a distance equal to but one-half the length of the space covered by the figures on the table. It follows that by using two widely separated slots movement of the slide necessary to cover the whole table is greatly reduced and may be reduced to a minimum. Furthermore, the employment of an expansive slide obscures from view a large part of the numbers on the table, and particularly all but those which are relatively remote from the transverse line of figures in which the one desired appears. Confusion of vision is thus avoided. Strain upon the eyes may be further relieved by making the finder green.

In Figs. 3, 4 and 5, I have shown a cheaper and simpler embodiment of the invention. D, D' are two tables, preferably of stiff paper or card-board, and E is the finder-slide passing completely around the tables, the finder and tables being relatively movable. In manipulating this form of the invention it will probably be found most convenient to hold the finder fixed and to impart movement to the tables. The wide finder depends over or extends across and bears against the two parallel side edges of the table or tables and in its movement is accurately guided by said edges. Preferably the finder has two slots $e$, $e'$ through both sides thereof, (Fig. 4) and the tables are printed on both sides so that they can be removed from the finder and turned over. The capacity of the device is thus greatly increased. Any number of tables may be employed, and, if desired, the slots $e$, $e'$ may be omitted from one side of the finder. For certain uses of the invention (hereafter explained) openings $f$, $f'$ are placed at one end of the slots $e$, $e'$ respectively; these openings may form continuations of the slots, as shown in the drawings, or they may be made separate therefrom. The function of these openings $f, f'$ may be performed by means illustrated in Figs. 6 and 7. When, for example, the table is divided up into sections each representing results at a different rate per hour, and having a different quarter-hour value, it is desirable that the operator shall have before him a conveniently exposed indication of these values for the particular section of the table upon which he is working. As shown in Fig. 6, the finder has a small disk or wheel $g$ rotatably mounted in its edge and movable under two small openings $g', g^2$. The disk $g$ has a serrated or milled periphery so that it may be rotated with the thumb or finger to bring numbers thereon beneath the openings $g, g^2$. In Fig. 6 the number "16," indicating a rate per hour, is exposed through opening $g'$, and the number "4," indicating the rate per quarter hour, is exposed through opening $g^2$. Somewhat similar means are shown in Fig. 7 for indicating the position of the slots $o$ and $p$ relative to different sections (such as shown in Fig. 5) of a table. A suitable tray (such as A of Fig. 2) has an overhanging flange $n$, in which are two openings $r$ and $s$. A disk or wheel $x$ has numbers printed thereon adapted to be displayed through openings $r$ and $s$ according to the position of finder-slide K. A pinion $i$ in engagement with wheel $x$ is driven by a gear wheel $k$, which latter meshes with a rack $m$. In the position shown the slot $o$ is over a 6 cents per hour section of the table and slot $p$ over a 14 cents per hour section thereof.

Having thus described the purely mechanical features of the invention, I will next explain the improvements relating to the arrangement of the numbers representing results and factors thereof.

Referring first to the 6% interest table shown in Fig. 1, the numbers 1, 2, 3, etc., to 90, arranged in a vertical column at the left, represent days, while the three horizontal rows of numerals 1 to 9 inclusive, one across the top of the table and two across finder-slide C adjacent to slots $d$ and $d'$ respectively, represent dollars. The numbers representing interest are disposed in vertical columns beneath the numbers representing dollars and form horizontal columns with the numbers representing days. Only a few of the interest numbers are shown. To facilitate locating the decimal point when the interest on $10., $100., $5000., etc. is to be estimated, a space is provided between the second and third and the fifth and sixth digits of each interest number.

In ascertaining the interest, for example, on $359 at 6% for 27 days, the operation is as follows: The finder C is moved until the number 27 appears at the left-hand end of slot $d$, as shown in Fig. 1. By moving the decimal point two places to the right in the number appearing in slot $d$ under the "3" on the finder C, I get $1.391507 as the interest on $300. for the time specified. In a similar manner, by moving the decimal point one place to the right in the number appearing under "5" on the finder, I get $.2219718 as the interest on $50. for the same period. The number $.03994521 appearing in the slot under "9" on the slide, is the interest on $9 for 27 days. These three numbers (1.391507— .2219718—and .03994521) equal, when added together, $1.65 which is the interest on $359 for 27 days at 6%. In case the numbers representing interest are on the lower part of the table, they are read through slot $d'$.

The table D, shown in Fig. 4, is divided into sections each comprising numbers representing interest at different percentages, and a vertical series of numbers corresponding to the percentage of each section are placed at the right-hand edge of the table. By observing these numbers as they appear through openings $f, f''$ the operator is assured that he is reading from the proper section.

As shown in Fig. 5, the device is adapted to the computation of wages. The table is divided into sections corresponding to different rates per hour, and each section comprises numbers (only a few of which are shown) representing the value of from 1 to 60 hours and half-hours wages at a given price per hour. The numbers representing results are disposed in horizontal alinement with numbers 0—10—20—30—40—50 and 60 arranged vertically at the edge of table D and indicating hours. They are also disposed in vertical alinement with two rows of numbers 0—1—2—etc. to 9, 0—0 1/2—1 1/2—etc. to 9 1/2, extending across the finder slide in proximity to the slots $e$ and $e'$, respectively. At the right-hand end of each wage-section the table bears a series of vertically disposed numbers, as 14,—14—14—, representing the rate per hour of that section. Each of said numbers has a coefficient, as 3 1/2, representing the rate of wages per quarter hour. To illustrate the operation of the device, suppose it is desired to ascertain the value of 35 1/2 hours wages at 18 cents per hour,—the finder and table are moved relatively until the number of hours "30" appears in the left-hand end of slot $e$ and the rate per hour "18," appears in the opening $f$. The number $6.39, appearing in the slot $e$ beneath the "5 1/2" above said slot, is the result sought. If the value of 35 3/4 hours is sought, the operator mentally adds the coefficient 4 1/2 cents, appearing in opening $f$, to $6.39. If the number representing the result appears on the lower part of table D, it is read through slot $e'$.

The construction of the device, as well as the arrangement of the numbers may of course be varied without departing from the nature and principle of the invention. Rapidity of use may be further facilitat  by printing the numbers in contrasting colors and by analogous expedients which I need not detail.

What I claim is:—

1. A computing device consisting of a table bearing numbers representing many results disposed in longitudinal and transverse columns or rows, said table also bearing two longitudinal marginal rows of characters indicating factors of the results, and a finder extending across said table and having therethrough a transverse slot and an opening through which results numbers and a character in each of the two factor character rows may be simultaneously observed, said finder and table being relatively movable longitudinally only.

2. A computing device consisting of a table bearing numbers representing many results disposed in longitudinal and transverse columns or rows, said table also bearing two longitudinal marginal rows of characters indicating factors of the results, a finder extending across said table and having therethrough two relatively distant transverse parallel slots and an opening at the end of each slot through which results numbers and a character in each of the two factor character rows may be observed, said finder bearing adjacent to each slot a transverse row of other factor characters disposed in line with longitudinal rows of the results numbers on the table, and said table and finder being relatively movable longitudinally only.

3. A computing device consisting of a table bearing numbers representing many results disposed in longitudinal and transverse columns or rows, said table also bearing two longitudinal marginal rows of factor characters, each factor character of one row having a coefficient also inscribed upon the table, a finder extending across said table and having therethrough a transverse slot and an opening through which results numbers and a character in each of the two factor character rows may be simultaneously observed, said finder and table being relatively movable longitudinally only.

4. A computing device consisting of a table bearing numbers representing many results disposed in longitudinal and transverse columns or rows, said table also bearing two longitudinal marginal rows of factor characters, each factor character of one row having a coefficient also inscribed upon the table, a finder extending across said table and having therethrough two relatively distant transverse parallel slots and an opening at the end of each slot through which results numbers and a character in each of the two factor character rows may be observed, said finder bearing adjacent to each slot a transverse row of other factor characters disposed in line with longitudinal rows of the results numbers on the table, and said table and finder being relatively movable longitudinally only.

5. A computing device consisting of a table bearing numbers representing many results disposed in longitudinal and transverse columns or rows, said table also bearing two longitudinal marginal rows of characters indicating factors of the results, one row at each side of the table, and a wide finder extending across said table and having therethrough two relatively distant transverse parallel slots separated by a continuous solid portion of the finder obscuring the table between said slots, said slots in the finder being of such size as to simultaneously expose a transverse line of results characters and corresponding factor characters in each of the two marginal factor character rows, said finder bearing adjacent to each slot a transverse row of other factor characters disposed in line with longitudinal rows of the results numbers on the table, and said table and finder being relatively movable longitudinally only.

In testimony whereof I have signed this specification in the presence of two subscribing witnesses.

CHARLES W. DRAPER.

Witnesses:
REEVE LEWIS,
WM. B. KERKAM.